Patented Sept. 5, 1922.

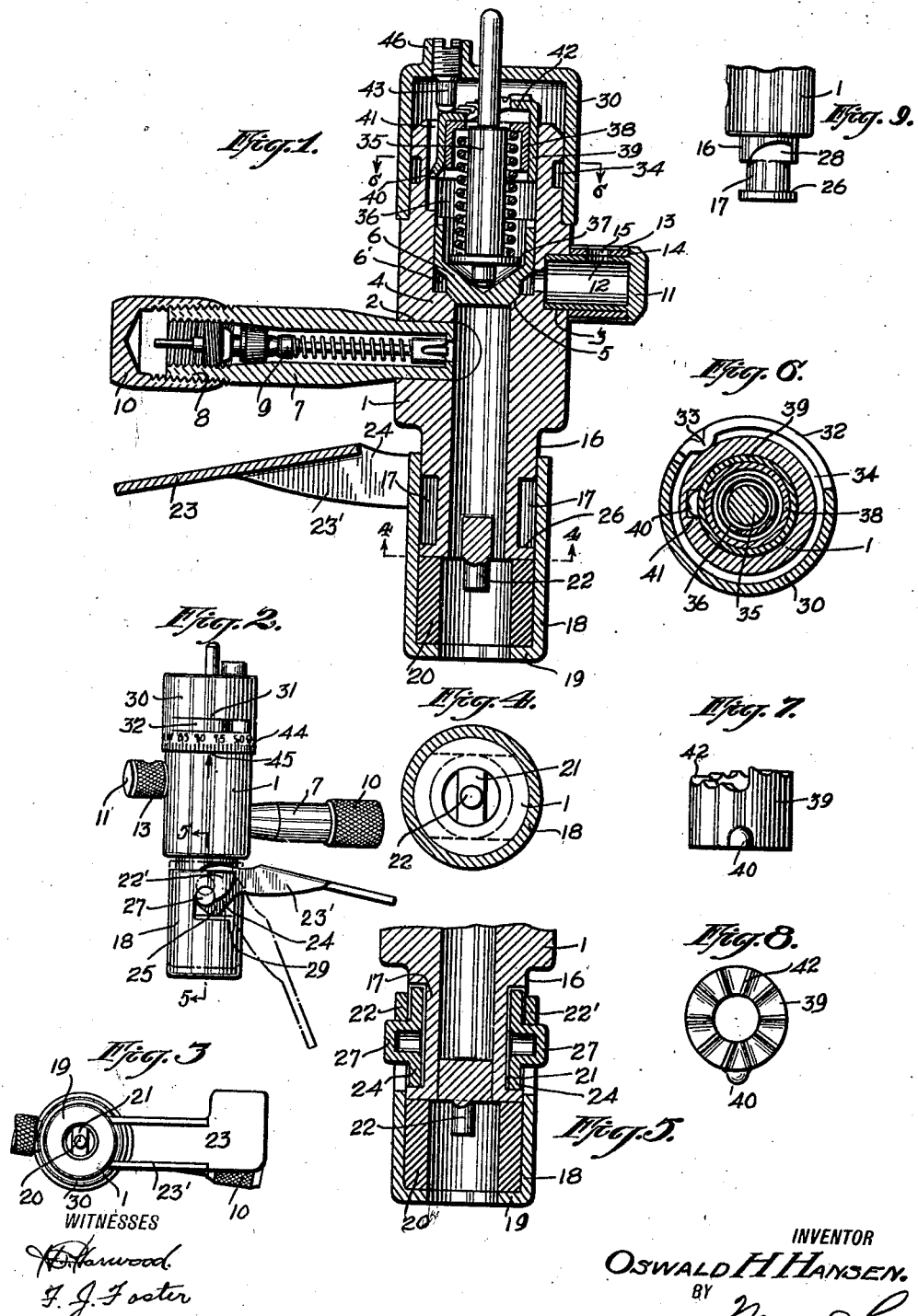

1,428,502

UNITED STATES PATENT OFFICE.

OSWALD H. HANSEN, OF NEW YORK, N. Y.

TIRE-PRESSURE-GAUGE CONNECTION.

Application filed March 26, 1921. Serial No. 455,733.

*To all whom it may concern:*

Be it known that I, OSWALD H. HANSEN, a subject of the King of Norway, and a resident of the city of New York, Elmhurst, borough of Queens, in the county of Queens and State of New York, have invented a new and Improved Tire-Pressure-Gauge Connection, of which the following is a full, clear, and exact description.

This invention relates to improvements in tire pressure gauges, an object of the invention being to provide a combination gauge and safety air chuck for attachment to tire valves, so that a pneumatic tire may be inflated to any predetermined pressure.

A further object is to provide a pressure gauge and chuck equipment with a safety device, which will blow off at any predetermined pressure, warning the operator that the desired pressure has been reached in the tire.

Another object is to provide a pressure gauge of the character stated, which is exceedingly simple and practical in construction, embodying certain novel features which tend to materially lessen the cost of manufacture, and which in no way detract from the strength, durability and efficiency of the apparatus.

With these and other objects in view, the invention consists in certain novel features of construction and combinations and arrangements of parts as will be more fully hereinafter described and pointed out in the claims.

In the accompanying drawings:—

Figure 1 is a view in vertical section through my improved pressure gauge;

Figure 2 is a reduced view in side elevation thereof;

Figure 3 is a fragmentary top plan view thereof;

Figure 4 is a sectional plan view on the line 4—4 of Figure 1;

Figure 5 is an enlarged fragmentary view in vertical section;

Figure 6 is a view in transverse section on the line 6—6 of Figure 1;

Figure 7 is a view in side elevation of the cam 39;

Figure 8 is a top plan view of Figure 7; and

Figure 9 is a fragmentary view in side elevation of the lower end of the casing.

Referring in detail to the drawings, 1 represents a cylindrical hollow casing having an air inlet port 2 in one side and an air outlet port 3 at a point diametrically opposite the inlet port and spaced above the inlet.

An annular internal shoulder 4 in the casing between the ports 2 and 3, is bevelled, as indicated at 5, to provide a seat for a cup-shaped valve such as 6, slidable vertically in the enlarged upper end of the bore of the casing and formed adjacent its lower end with an annular groove 6' communicating with the outlet port 3.

An elongated nipple 7 has one end frictionally fitted into the inlet port 2, and at its outer end is externally screw threaded, as indicated at 8, to facilitate the attachment of a nozzle of an air hose (not shown) thereto. A conventional form of air check valve designated in its entirety by the reference numeral 9, is mounted in the nipple 7 for a purpose which will hereinafter appear. A dust cap 10 may be screwed on to the outer end of the nipple 7 when the gauge is not in use.

A hollow plug 11 frictionally fitted into the outlet port is provided with an opening or vent 12. A split sleeve 13 is located around the plug 11 between the casing 1 and a flange 14 on the outer end of the plug and is provided with an opening 15 adapted to be moved into registration with the opening 12 upon turning of the sleeve. The sleeve 13 may be turned to close the opening 12 and serve as a dust guard when the device is not in use.

Adjacent its lower end, the casing 1 is externally reduced, as indicated at 16, and a relatively wide groove 17 is provided around the reduced lower end of the casing. 18 represents a sleeve fitting over and extending below the reduced lower end of the casing. The sleeve is formed at its lower end with an internal annular lip or flange 19.

A rubber collar 20 is supported on the flange 19 and when the sleeve is in its normal position abuts against the lower end of the casing 1. This collar is adapted to embrace the nipple which is provided on the ordinary inner tube. In order to operate the stem of the usual check valve, which is located within such nipple, I provide a cross bar 21 driven into the lower end of the casing 1 and carrying a downwardly presented integral pin 22. This pin is adapted to engage the valve stem and hold the valve open while air is pumped into a tube.

It will be apparent that by raising the sleeve 18 relative to the casing 1, the collar 20 will be compressed and bulge inwardly to firmly grip a nipple or other projecting air inlet. In order to accomplish this movement of the sleeve, the upper end of the sleeve is cut away at one side and the sleeve is recessed to provide at its upper end a pair of hooked arms 22′, straddling the casing.

A lever 23 includes a flat handle and a pair of integral tapered webs 23′ at each side. These webs terminate in arms 24, straddling the casing 1 and located in the groove 17. The arms 24 include angular shoulders 25 adapted to fulcrum on the shoulder 26, which forms the lower wall of the annular groove 17. The arms are also formed with outwardly pressed studs 27 located under the hooked arms 22′ and engageable with these arms to raise the sleeve 18 and bulge the collar 20 when the lever is depressed. The casing 1 is formed with diametrically opposed curved recesses 28 communicating with the upper end of the groove 17 to provide clearance for the arms 24 and the sleeve 18 is cut away, as indicated at 29 to accommodate the webs 23′ when the lever is depressed.

30 represents a cap fitting over the upper end of the casing. This cap is slitted, as indicated at 31 to provide an arcuate tongue 32. An instruck lug 33 on the tongue 32 rides in an annular groove 34 around the outer face of the upper end of the casing and prevents accidental vertical movement of the cap.

A central opening in the upper end of the cap 30 accommodates the reduced upper end of a valve stem 35, bearing at its lower end against the valve 6. A coiled expansion spring 36 located around the stem 35 between a disc 37 fixed to the stem adjacent its lower end and a collar 38 slidable freely on the upper end of the stem tends to hold the valve on its seat when the collar 38 is depressed, as will be readily understood.

An annular cam member 39 fits into the upper end of the casing and over the collar 38. An outstruck lug 40 on the cam member 39 rides in a vertical slot or groove 41 in the casing and prevents rotary movement of the cam member.

The cam member 39 at its upper edge is formed with an inwardly presented cam flange 42 having a series of pockets in its upper face selectively engaged by a stud 43 projecting downwardly from the cap. It will be seen that by rotating the cap 30 to seat the stud 43 in different pockets, the cam will be depressed, actuating the collar 38 and increasing the tension on the spring 36.

The lower edge of the cap 30 is graduated, as indicated at 44, and these graduations register with an indicating mark such as 45 on the outer face of the casing. By turning the cap 30 until the desired graduation registers with the mark 45, the correct tension will be applied to the spring 36, so that the valve 6 will blow off when the pressure in the tire has reached the desired height.

The stud 43 is preferably in the form of a screw engageable in a threaded post 46 in the cap. This screw is adjusted to test the accuracy of the graduations on the cap and the post is then permanently crimped around the same to prevent its accidental turning.

The operation of the device may be briefly described as follows:—

In order to inflate a pneumatic tire, the collar 20 is slipped over the nipple of the inner tube and the lever 23 is moved to bulge the collar and tightly clamp the nipple. The sleeve 13 is turned to open the vent 12. The dust cap 10 is removed and the nozzle of an air hose is attached to the nipple 7. The cap 30 is turned until the valve 6 is set to blow off at the desired pressure and air is pumped into the tube. When the tire is inflated to the desired pressure, the valve 6 will be lifted permitting an escape of air through the outlet port. The air hose is then detached from the nipple 7, the check valve 9 serving to prevent an escape of air through the casing while the valve in the tire is held open by the pin 22.

Various forms of inlet pipes or nipples might be substituted for the nipple 7, depending upon the type of air hose to be attached, and numerous other slight changes and alterations might be made in the general form and arrangement of the parts described without departing from my invention, and hence I do not wish to limit myself to the precise details set forth, but shall consider myself at liberty to make such slight changes and alterations as fairly fall within the spirit and scope of the appended claims.

I claim:

1. In a coupling of the class described, a casing, a sleeve slidable on the lower end of the casing and including an internal flange at its lower end, a resilient collar interposed between said flange and the end of said casing, a cam lever pivotally connected to the sleeve and fulcruming on the casing to slide said sleeve and positively effect internal bulging of said collar, said casing having an annular groove therein, said lever including arms straddling the casing and fulcruming on the bottom wall of said groove, and said arms being pivotally connected to said sleeve.

2. In a coupling of the class described, a casing, a sleeve slidable on the lower end of the casing and including an internal flange at its lower end, a resilient collar interposed between said flange and the end of said casing, a cam lever pivotally connected to the sleeve and fulcruming on the casing to slide said sleeve and positively effect internal bulging of said collar, said casing having an annular groove therein, said lever including arms straddling the casing and fulcruming on the bottom wall of said groove, and outstruck lugs on said arms, said sleeve being cut away to provide hook-shaped arms supported on said lugs.

3. In a device of the character described, a casing having a relatively wide external annular groove adjacent its lower end, a sleeve fitting over the lower end of the casing, an inwardly presented annular lip around the lower end of the sleeve, a rubber collar supported on the lip and abutting against the lower end of the casing, said sleeve being cut away to provide at its upper end a pair of downwardly hooked arms straddling the casing, a lever, arms on the lever located in the groove and straddling the casing, shoulders on the arms fulcruming on the lower wall of the groove, studs on the arms located under the hooked arms, whereby operation of the lever raises the sleeve to compress the rubber collar.

4. A device of the character described in claim 3 and including a cross bar frictionally fitting within the lower end of the casing, a depending pin integral with the cross bar and adapted to engage the stem of a check valve when the collar is moved to embrace the nipple of such a valve.

OSWALD H. HANSEN.